(12) United States Patent  
Griffin

(10) Patent No.: US 7,099,359 B2
(45) Date of Patent: Aug. 29, 2006

(54) OPTICAL PULSE TRAIN GENERATOR

(75) Inventor: Robert Anthony Griffin, Northants (GB)

(73) Assignee: Bookham Technology, plc, Abingdon (GB)

( * ) Notice: Subject to any disclaimer, the term of this patent is extended or adjusted under 35 U.S.C. 154(b) by 289 days.

(21) Appl. No.: 10/333,570

(22) PCT Filed: Jul. 9, 2001

(86) PCT No.: PCT/GB01/03082

§ 371 (c)(1),
(2), (4) Date: Sep. 12, 2003

(87) PCT Pub. No.: WO02/09325

PCT Pub. Date: Jan. 31, 2002

(65) Prior Publication Data
US 2004/0253000 A1 Dec. 16, 2004

(30) Foreign Application Priority Data
Jul. 22, 2000 (GB) .................. 0017937.4

(51) Int. Cl.
*H01S 3/10* (2006.01)
*G02B 26/00* (2006.01)
(52) U.S. Cl. .................. 372/26; 359/237; 372/30
(58) Field of Classification Search .................. 372/26
See application file for complete search history.

(56) References Cited
U.S. PATENT DOCUMENTS 4,340,966 A * 7/1982 Akiba et al. .............. 372/45.01
4,866,698 A * 9/1989 Huggins et al. ............... 398/43
5,828,682 A   10/1998 Moores ......................... 372/26
2002/0141027 A1* 10/2002 LaGasse et al. ............ 359/237

FOREIGN PATENT DOCUMENTS

EP    0 854 375 A    7/1998

OTHER PUBLICATIONS

"Tunable RF Optical Source Using Harmonic Carrier Generation," by S. A. Pappert et al., High-Speed Semiconductor Lasers for Communication, San Jose, CA, US, Feb. 10-11, 1997, vol. 3038, pp. 89-96.

"50-Gbit/S Optical Pulse Storage Ring Using Novel Rational-Harmonic Modulation," by J. D. Moores et al., Optics Letters, Optical Society of America, Washington, US, vol. 20, No. 24, Dec. 15, 1995, pp. 2547-2549.

(Continued)

*Primary Examiner*—Armando Rodriguez
(74) *Attorney, Agent, or Firm*—Lahive & Cockfield, LLP; Anthony A. Laurentano, Esq.

(57) ABSTRACT

An optical pulse train generator (2) for use in the transmission of high speed optical data in a return-to-zero (RZ) signalling format is described. The generator (2) comprises a light source (4) operable to produce an unmodulated output; an electro-optic interferometric optical modulator (6) for intensity modulating the unmodulated optical output in dependence on an sinusoidal drive voltage ($v_{drive}$) to produce a modulated optical signal, wherein the modulator (6) has an optical transmission versus drive voltage characteristic which is sinusoidal in form and wherein the modulator (6) is operable about a point of minimum optical transmission of said characteristic and said drive voltage has a amplitude ($V_{drive}$) which exceeds one cycle ($V_\pi$) of said characteristic such that the modulated optical signal is non-sinusoidal; and optical pulse shaping means (8, 10, 12) for aligning the phase of the frequency components of said modulated optical signal to produce an optical pulse train in which the pulses are substantially transform limited.

15 Claims, 3 Drawing Sheets

OTHER PUBLICATIONS

"Transform-Limited Optical Pulse Generation Up to 20-GHZ Repetition Rate by a Sinusoidally Driven Ingaasp. Electroabsorption Modulator," by M. Suzuki et al., Journal of Lightwave Technology, IEEE., New York, US, vol. 11, No. 3, Mar. 1, 1993, pp. 468-473.

* cited by examiner

OPTICAL PULSE TRAIN GENERATOR

This invention relates to an optical pulse train generator and more especially, although not exclusively, to a such a generator for use in an wavelength division multiplex (WDM) optical communications system using a return-to-zero (RZ) signalling format.

In optical communications systems, data is typically transmitted in the form of optical pulses in which the presence of a pulse indicates a first binary data state and the absence the alternative data state. When the optical pulse level is constant over each data bit interval, such a signalling format is termed non-return-to-zero (NRZ) and can be readily generated by either directly modulating a laser source in dependence on the data to be transmitted or more typically, especially at higher transmission rates, by operating the laser to produce a continuous unmodulated optical output and externally modulating the optical output using an optical modulator.

It has been demonstrated for optical communications systems with a transmission data rates of 10 Gbs$^{-1}$ and above that these are likely to be most successfully operated using a return-to-zero (RZ) format, rather than the conventional NRZ signalling format. RZ signalling has been demonstrated to be more tolerant to impairments due to optical nonlinearity, which limit performance in amplified, dispersion-managed optical links. The RZ format is likely to be widely used in future dense wavelength-division multiplexed (DWDM) optical networks transmitting with a data rate of 10 Gbs$^{-1}$ over long optical fibre spans (i.e. of the order of 1000 km and above), and for data rates of 40 Gbs$^{-1}$ per channel and above over short fibre spans (i.e. of the order 100 km).

In the RZ signalling format one data state is represented by the absence of an optical signal whilst the alternative data state is represented by an optical pulse whose duration is shorter than that of the transmission bit rate such that the optical pulse level "returns to zero" for a part of each data bit interval. To generate optical RZ data requires a source of short duration optical pulses (optical pulse train) with a repetition rate equal to the transmission bit rate and such a source will hereinafter be referred to as an optical pulse train generator. The optical pulse train is then intensity modulated using an external optical modulator in dependence on the transmitted data to generate the optical RZ data for transmission.

An important parameter of the optical pulse train generator is the duty cycle of the optical pulse train, that is the ratio of pulse fill-width half-maximum (FWHM) intensity, $\Delta\tau$, to the pulse repetition period T. The optimum duty cycle of the pulse train depends on the details of the particular transmission system. For a DWDM system a low duty cycle can minimise impairment due to self-phase modulation, whereas a duty cycle of approximately a half can minimise impairments due to cross-phase modulation and adjacent channel cross-talk.

Various methods of generating the optical pulse train are known. For example in one arrangement the optical pulse train is directly generated using a solid state mode-locked laser. Whilst such lasers can provide high quality pulse trains these devices are generally complex and accordingly expensive. Furthermore since the characteristics of the pulse train are determined by the fundamental mode supported by the laser cavity, a given laser can only operate with a fixed wavelength and generate pulses of a fixed duty cycle.

It is also known to use a gain-switched semiconductor laser to generate the pulse train. Again such lasers operate at fixed wavelengths and additionally require dispersion compensation to realise transform-limited pulses. Furthermore it is also probable that gain-switched lasers would require interleaving to generate 40 Gbs$^{-1}$ pulse trains.

Most commonly it is known to generate the optical pulse train by externally intensity modulating a CW (continuous wave) optical source using an electro-optic interferometric optical modulator, most commonly a Mach Zehnder optical modulator. As is known such modulators have an optical transmission versus applied drive voltage which is sinusoidal (raised cosine) in form and the modulator is electrically biased such that it operates at a point of minimum optical transmission. By applying a drive signal whose frequency is half the desired pulse repetition rate this produces a train of optical pulses with a duty cycle of approximately a half. Alternatively, by biasing the modulator at a point of maximum optical transmission this generates an optical pulse train in which the pulses have a lower duty cycle. Although with such an arrangement the duty cycle can be varied to a limited extent this results in a corresponding variation of the extinction of the pulses.

A need exists therefore for an optical pulse generator which is capable of generating a train of pulses with a repetition rate of 10 Gbits$^{-1}$ and above with a selectable duty cycle which can operate for a range of wavelengths. The present invention has arisen in an endeavour to provide an optical pulse train generator for use in a DWDM system whose duty cycle can be varied.

According to the present invention an optical pulse train generator comprises: a light source operable to produce an unmodulated optical output: an electro-optic interferometric optical modulator for intensity modulating the unmodulated optical output in dependence on a sinusoidal drive voltage to produce a modulated optical signal, wherein the modulator has an optical transmission versus drive voltage characteristic which is sinusoidal in form and wherein the modulator is operable about a point of minimum optical transmission of said characteristic and said drive voltage has an amplitude which exceeds one cycle of said characteristic such that the modulated optical signal is non-sinusoidal; and optical pulse shaping means for aligning the phase of the frequency components of said modulated optical signal in the frequency domain to produce an optical pulse train in which the pulses are substantially transform limited. In the context of this patent application, and for the avoidance of doubt, transform limited is to be construed as having its well known meaning as for example defined in A. E. Siegman (1986) "Lasers", University Science Books, Mill Valley Calif., pages 331–335, which is hereby incorporated by way of reference thereto. A transform limited pulse is a pulse having a duration which is a minimum which is dictated by its spectral (frequency) content; more particularly it is a pulse having substantially no frequency chirp or other internal phase or amplitude substructure such that its time-bandwidth product (pulse width-spectral width product) is close to 0.5.

Since the pulse train generated is independent of the wavelength of light the pulse generator of the present invention is particularly suited for use in wavelength division multiplex optical communications system. Furthermore it will be appreciated that the duty cycle of the pulses can be readily adjusted by adjusting the amplitude, that is the peak to peak voltage swing, of the sinusoidal drive voltage.

Preferably the modulator comprises a Mach Zehnder optical modulator which is fabricated in a III-V semiconductor material, most preferably gallium arsenide or alternatively in lithium niobate.

Advantageously the light source comprises a semiconductor laser such as an indium gallium arsenide phosphide DFB (distributed feedback) laser or tuneable laser.

Preferably the optical pulse shaping means comprises one or more interferometric is devices which splits said modulated optical signal into two optical signals which pass along respective paths and which recombines said optical signals to form the optical pulse train, and wherein the or each device applies a selected fixed differential optical delay between said optical signals, said optical delay being selected such as to align the phase of a selected frequency component of the modulated optical signal. In a preferred arrangement the length of said paths are selected to be different such as to introduce the selected differential optical delay. In a much preferred implementation said device is an electro-optic device and one path includes means, most conveniently one or more electrodes, for changing the refractive index of one path relative to the other to introduce the or a part of said differential optical delay. Such an arrangement enables the characteristics of the device to be optimised by the application of appropriate fixed voltage to the electrode. Preferably the or each interferometric device is fabricated in a III-V semiconductor material, most preferably gallium arsenide, thereby enabling the optical modulator and interferometric device/s to be monolithically fabricated.

When it is intended to generate a pulse train having a repetition frequency of 10 Gbs$^{-1}$ or more the difference in path length of the or each device introduces a delay of a few tens of pico seconds whilst the differential delay introduced by said difference in refractive index is in the range zero to two pi radians of the frequency of the drive voltage.

According to a second aspect of the invention a return-to-zero (RZ) optical data generator incorporates an optical pulse train generator described above which is operable such that the frequency of the sinusoidal drive voltage is half the intended data bit rate and further comprises optical modulating means for intensity modulating said optical pulse train in dependence on said data.

Preferably the optical modulating means comprises an interferometric electro-optic modulator, most preferably a Mach Zehnder modulator. Advantageously the modulating means is fabricated in a III-V semiconductor material, most preferably gallium arsenide, thereby enabling the modulating means, optical modulator and optical pulse shaping means to be monolithically fabricated.

The RZ optical data generator of the present invention finds particular application in an optical communications system in which the data bit rate is 10 Gbs$^{-1}$ or higher and which is a wavelength division multiplex system.

In order that the invention can be better understood an optical pulse generator in accordance with the invention will now be described by way of example only with reference to the accompanying drawings in which.

Figure 1:
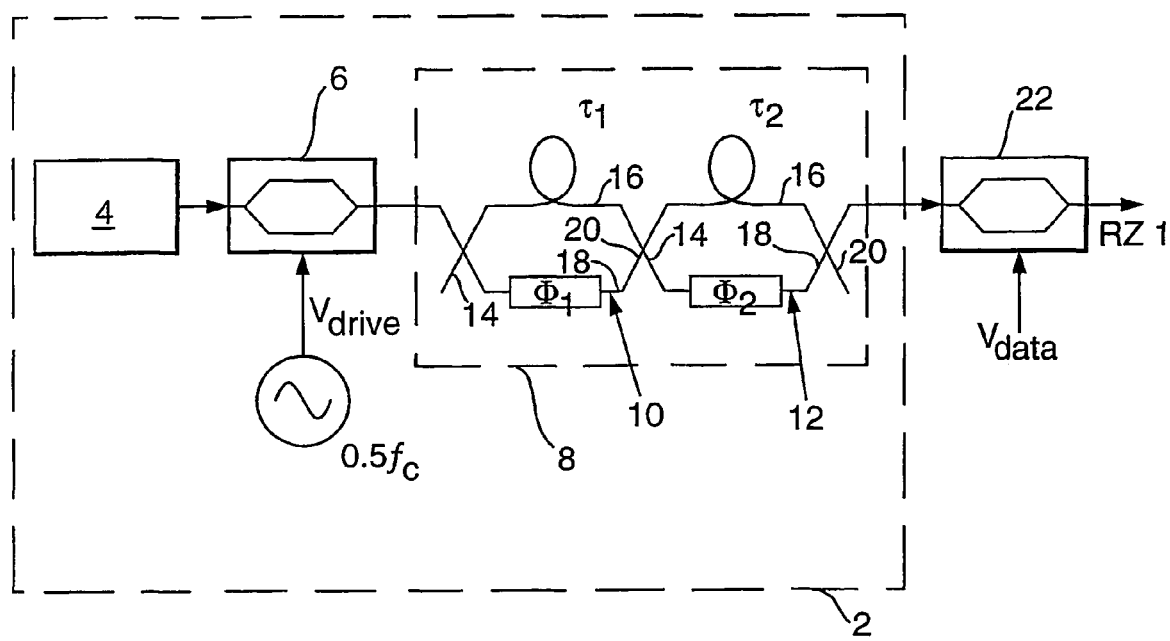
FIG. 1 is a schematic representation of an optical RZ data generator incorporating an optical pulse generator in accordance with the invention.
Figure 4A:
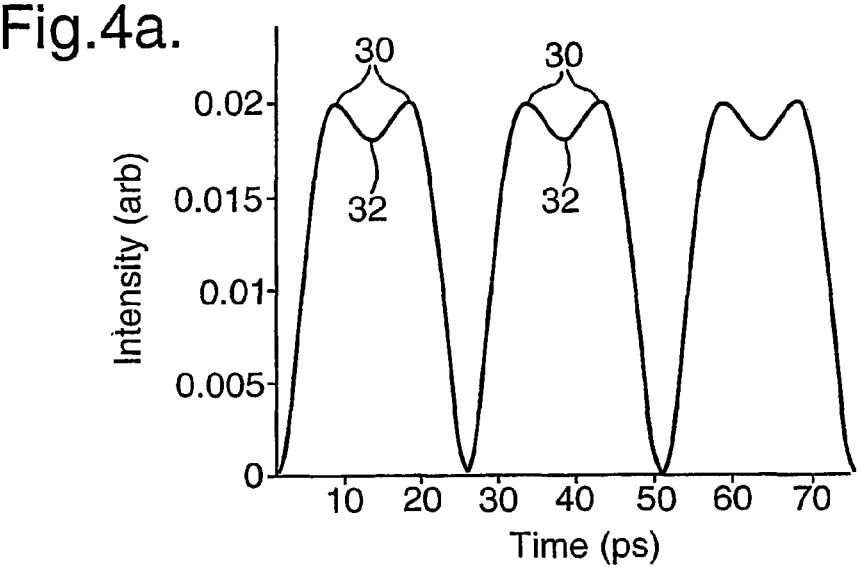
Figure 4B:
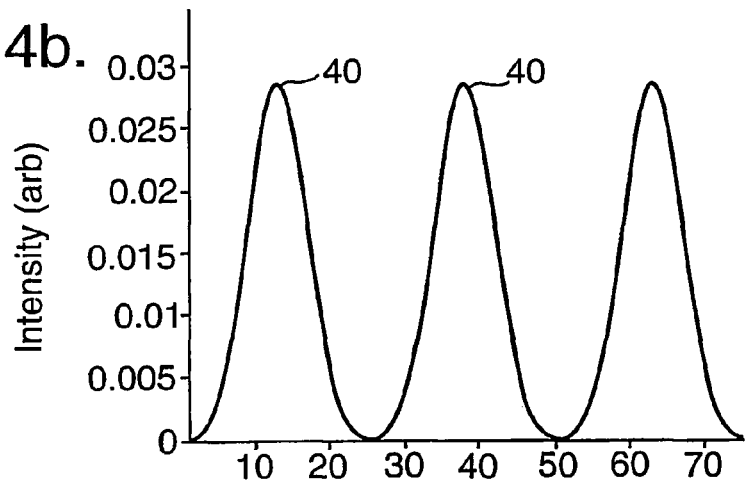
Figure 5:
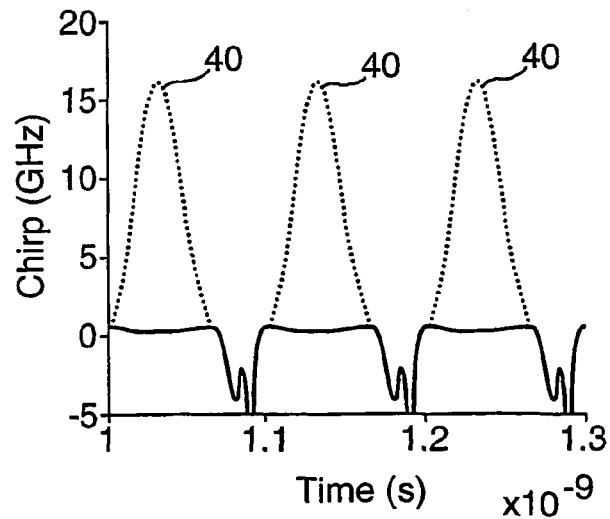

FIG. 4a is a plot of optical intensity versus time appearing at the output of the modulator of the pulse generator of FIG. 1 for a drive voltage amplitude $V_{drive}=1.2V_\pi$ FIG. 4b is an optical pulse train generated by the optical pulse generator of FIG. 1 for a drive voltage amplitude $V_{drive}=1.2V_\pi$; and FIG. 5 is a plot of frequency chirp (indicated by a solid line) versus time for an optical pulse train generated with a drive voltage amplitude $V_{drive}=1.5V_\pi$.

Referring to FIG. 1 there is shown an optical return-to-zero (RZ) data generator for generating a RZ signalling format optical data for use in a dense wavelength division multiplex communication system having a channel data rate $f_c$ of 10 or 40 Gbits$^{-1}$. The RZ data generator comprises an optical pulse generator 2 and intensity optical modulator 22.

The optical pulse train generator 2 comprises in order, and optically connected in series, a laser 4, an optical modulator 6 and optical pulse shaper 8. In the embodiment described the laser 4 comprises an indium gallium arsenide phosphide (InGaAsP) semiconductor laser which is operable to produce an unmodulated (continuous wave) optical output of 1535–1620 nm dependent on the selected DWDM channel. In a preferred arrangement the laser typically comprises a respective DFB (distributed feedback) semiconductor laser for each DWDM channel and optical switching means for selecting a desired laser. In an alternative arrangement one or more tuneable semiconductor laser can be used. It will be appreciated that the specific type of laser, or light source, is determined by the characteristics of the optical communications system and can accordingly be modified within the scope of the present invention. The unmodulated optical signal is applied to an input of the optical modulator 6.

Figure 2:
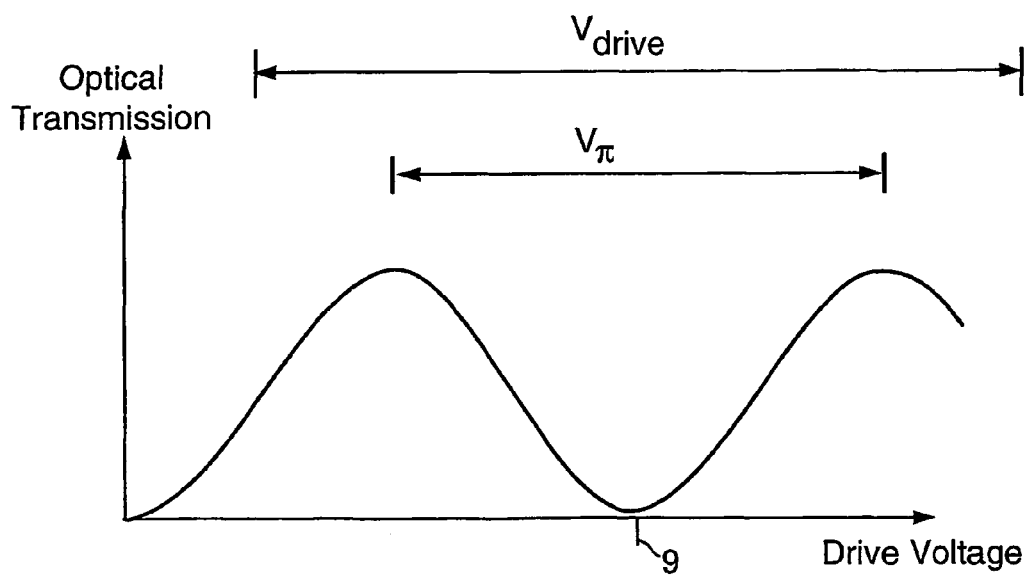
FIG. 2 is a plot of optical transmission versus drive voltage for an electro-optic optical modulator.
Figure 3A:
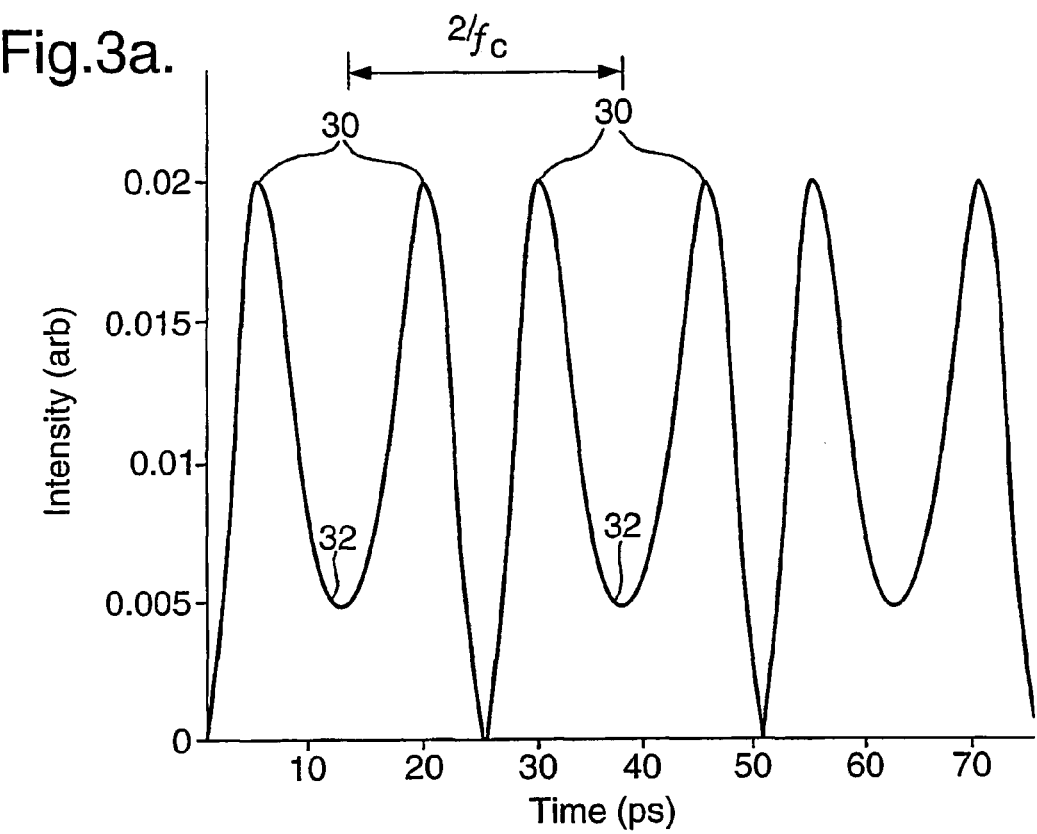
FIG. 3a is a plot of optical intensity versus time appearing at the output of the modulator of the optical pulse generator of FIG. 1 for a drive voltage amplitude $V_{drive}=1.7V_\pi$.
Figure 3B:
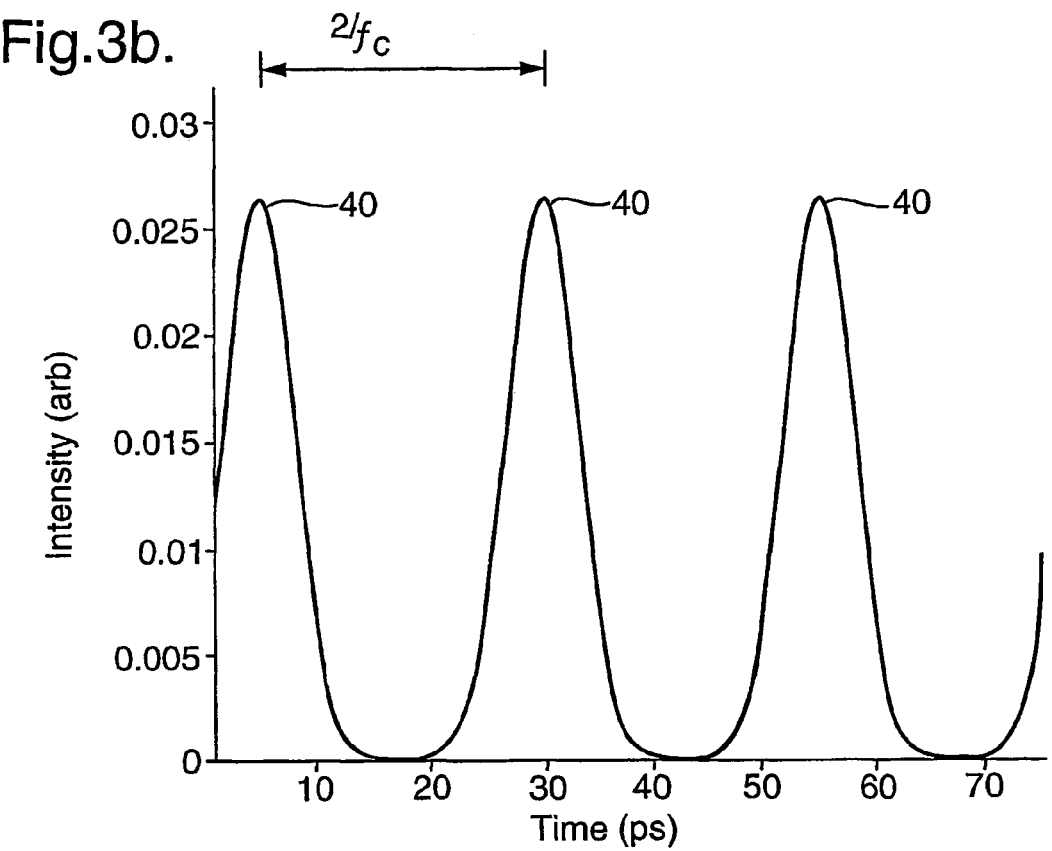
FIG. 3b is an optical pulse train (optical intensity versus time) generated by the optical pulse generator of FIG. 1 for a drive voltage amplitude $V_{drive}=1.7V_\pi$.

As will be described, for ease of fabrication and integration with the optical pulse shaper 8, the optical modulator 6 is preferably a Mach-Zehnder optical modulator which is fabricated in a III-V semiconductor material, most conveniently gallium arsenide. As is known, and as represented in FIG. 2, a Mach-Zehnder optical modulator has an optical transmission versus applied drive voltage $v_{drive}$ characteristic which is sinusoidal, raised cosine, in nature. The optical modulator 6 is driven with a sinusoidal drive voltage $v_{drive}$ whose frequency is half the clock rate of the data channel, that is 0.5 $f_c$, and is biased, by means of appropriate electrodes, to operate about a point 9 of minimum optical transmission on the modulator's characteristic with the drive voltage amplitude $V_{drive}$ (peak to peak voltage swing) being symmetrical about the bias point 9. This results in an intensity modulation of the unmodulated optical output produced by the laser 4 in which the intensity is dependent on the magnitude of the drive voltage $v_{drive}$. An important aspect of the generator of the present invention is the way in which the modulator 6 is driven and it is to be noted that the drive voltage amplitude $V_{drive}$ is greater than one voltage cycle $V_\pi$ of the optical modulator's characteristic; that is the optical modulator 6 is overdriven beyond its normal drive condition. Typically the drive voltage has an amplitude $V_{drive}$ of the order of $V_\pi$ to $1.7V_\pi$. Overdriving the modulator 6 in this manner results in it producing a modulated optical output waveform as represented in FIG. 3a which is for a drive voltage amplitude $V_{drive}=1.7V_\pi$. As will be appreciated from FIG. 3a the optical output comprises a train of pulse shaped features with a pulse repetition frequency 0.5 $f_c$ in which each pulse feature comprises a double peak 30 separated by a trough 32. In the frequency domain, as opposed to the time domain, the effect of this double peak 30 is to increase the optical spectral content of the optical waveform. In contrast when driving the modulator in the known way in which $V_{drive}=V_\pi$ this produces a substantially sinusoidal output having a single frequency component. This optical waveform is applied to the optical pulse shaper 8 which shapes the pulse features and results in a narrow transform-limited optical pulse train as illustrated in FIG. 3*b*.

The optical pulse shaper 8, which is described in detail below, is a dispersive all-pass filter, that is it does not substantially modify the intensity of the light it transmits but rather inverts the phase of selected frequency components of the optical signal in the frequency domain and so aligns the phase of these components. The additional frequency components generated by overdriving the modulator have an opposite phase to the other frequency component of the optical waveform. The transmission characteristic of the pulse shaper 8 is selected such as to align selected components which as can be seen by comparing FIGS. 3*a* and 3*b* results, in the time domain, in a train of optical pulses 40 in which each pulse is shorter in duration and whose peak intensity exceeds the intensity of the unmodulated laser output. The pulse shaper 8 thus produces an optical pulse train in which each pulse is substantially transform limited, that is the duration of each pulse is substantially a minimum which is dictated by its spectral content.

In a preferred arrangement, as represented in FIG. 1, the optical pulse shaper 8 comprises two concatenated asymmetric gallium arsenide Mach-Zehnder type interferometers 10, 12. Such an arrangement is particularly preferred since, as described above, this enables the pulse shaper 8 and optical modulator 6 to be monolithically fabricated as a single integrated device.

Each interferometer 10, 12 comprises a splitter 14 which splits the optical signal into two optical signals which pass along respective optical paths (arms) 16, 18 and a combiner 20 which combines the signals to form an optical output. The interferometers 10, 12 are each arranged such that they apply a selected differential optical group delay to the optical signals passing along the paths 16, 18. In the embodiment illustrated the differential delay is applied in the form of two components; a differential time delay $\Theta_1$, $\Theta_2$ and a relatively shorter time (phase) delay $N_1$, $N_2$ respectively for the two interferometers 10, 12.

The time delays $\Theta_1$, $\Theta_2$ are generated by having different physical lengths for the paths 16 and the phase delays $N_1$, $N_2$ are generated by applying a suitable voltage to an electrode provided on the shorter path 18 to modify the refractive index of the path. Typically for a 40 Gbs$^{-1}$ pulse train the differential optical delays $\Theta_1$, $\Theta_2$ are 8.3 and 12.5 picoseconds respectively. The phase delays $N_1$, $N_2$ are in the range zero to two pi radians depending on the wavelength of operation and provide a means of fine tuning to ensure the optical signals are in phase when they are recombined and thereby ensure the interferometers function as all pass filters. By appropriate selection of the path imbalance $\Theta_1$, $\Theta_2$ and relative optical phase $N_1$, $N_2$ of the interferometer arms, a high quality pulse train can be generated.

It will be appreciated that the optimum delays $\Theta_1$, $\Theta_2$ are determined only by the repetition rate of the pulses, and are independent of the source wavelength. With the asymmetric Mach-Zehnder interferometers adjusted for optimum pulse shaping, the duty cycle of the pulses can be readily varied while maintaining high extinction by simply adjusting the amplitude $V_{drive}$ of the applied drive signal. Control of the pulse duty cycle in this way is illustrated in FIGS. 4*a* and 4*b* which show the output waveform from the modulator 6 and the optical pulse train for a drive voltage amplitude $V_{drive}=1.2\ V_\pi$. By comparing FIGS. 3*b* and 4*b* it is to be noted that the increase in drive voltage amplitude results in a pulse train having the same repetition rate 0.5 $f_c$ but whose duty cycle is reduced. For a typical drive voltage range $V_\pi$ to $1.7V_\pi$ the duty cycle is of the order 0.41 to 0.30.

As will be appreciated the optical pulse generator of the present invention can be readily used to generate optical RZ data by modulating the optical pulse train using the intensity optical modulator 22. For ease of fabrication and to enable its integration with the optical pulse shaper 8 and modulator 6, the intensity modulator is preferably an electro-optic interferometric modulator, most preferably a Mach-Zehnder modulator which is fabricated in a III-V semiconductor material, most preferably gallium arsenide.

In general, for data transmission applications it is desirable that the pulses are unchirped, i.e. the instantaneous optical frequency of the pulses is constant. The calculated chirp for an optical pulse train generated using a drive voltage amplitude $V_{drive}=1.5V_\pi$ is illustrated in FIG. 5. As can be seen from FIG. 5 the frequency chirp is virtually zero over substantially the duration of each pulse with the only deviation in chirp occurring in the period between the pulses. For applications where a linear frequency chirp is desired, a phase modulator can be included in the optical pulse generator which is driven with a bit-synchronous waveform.

The optical pulse train generator of the present invention offers a number of benefits over the known generators which include:

Variable pulse duty cycle—the duty cycle of the pulse can be varied by adjusting the amplitude of the drive voltage whilst maintaining a high extinction. This allows the generator to be utilised in a range of optical links and networks.

Monolithic integration—since the optical pulse shaper can be readily fabricated in the form of planar waveguides this enables it to be integrated with the optical modulator resulting in a generator which is both compact and robust.

Increased pulse repetition rate—as only a single drive signal is required at a frequency which is half that of the data rate, this eases the requirements on the optical modulator bandwidth and enables the generation of pulse trains, with a higher repetition rate.

Ease of fabrication—the pulse shaper becomes easier to realise at higher frequencies, since the required path delays are reduced.

Power efficiency—the peak optical pulse power can be up to 3 dB higher than the unmodulated input power from the laser.

Alternating phase—the pulses in the pulse train have an alternating phase relative to the unmodulated laser output, this having been shown to be advantageous for transmission.

Wavelength flexibility—a given generator can be used over a large range of input wavelengths, requiring only adjustment of the optical phase shifts $N_1$, $N_2$ to suit a particular wavelength.

It will be appreciated that the optical pulse generator of the present invention is not limited to the specific embodiment described and that variations can be made which are within the scope of the invention. For example other forms of optical modulator can be used such as for example those fabricated in lithium niobate. Whilst in the arrangement shown the optical pulse shaper is realised as two Mach-Zehnder interferometers other forms of optical pulse shaper, such as ring resonator filter, can be used provided they align the frequency components to produce a pulse train in which the pulses are substantially transform limited.

The invention claimed is:

1. An optical pulse train generator, comprising: a light source operable to produce an unmodulated optical output; an electro-optic interferometric optical modulator for intensity modulating the unmodulated optical output in dependence on a sinusoidal drive voltage to produce a modulated optical signal, wherein the modulator has an optical transmission versus drive voltage characteristic which is sinusoidal in form and wherein the modulator is operable about a point of minimum optical transmission of said characteristic and said drive voltage has a amplitude which exceeds one cycle of said characteristic such that the modulated optical signal is non-sinusoidal; and optical pulse shaping means for aligning a phase of frequency components of said modulated optical signal in the frequency domain to produce an optical pulse train in which the pulses are substantially transform limited.

2. An optical pulse train generator according to claim 1 in which the modulator comprises a Mach Zehnder optical modulator.

3. An optical pulse train generator according to claim 1 in which the light source comprises a semiconductor laser.

4. An optical pulse train generator according to claim 1 in which the optical pulse shaping means comprises one or more interferometric devices which splits said modulated optical signal into two signals which pass along respective paths and which recombines said signals to form the optical pulse train, and wherein at least one of the one or more interferometric devices applies a selected fixed differential optical delay between said signals and wherein said optical delay is selected so as to align the phase of a selected frequency component of the modulated optical signal.

5. An optical pulse train generator according to claim 4 in which the length of said paths are selected to be different so as to introduce the selected differential optical delay.

6. An optical pulse train generator according to claim 4 in which said device is an electro-optic device, and wherein at least one of said paths includes means for changing the refractive index of said path relative to another path to introduce at least a portion of said differential optical delay.

7. An optical pulse train generator according to claim 4 in which at least one of the one or more interferometric devices is fabricated in a III-V semiconductor material.

8. An optical pulse train generator according to claim 7 in which at least one of the one or more interferometric devices is fabricated in Gallium Arsenide.

9. An optical pulse train according to claim 5 in which the difference in path length introduces a delay of a plurality of tens of pico seconds.

10. An optical pulse train generator according to claim 9 in which said differential delay introduced by said difference in refractive index is in the range zero to two pi radians of the frequency of the drive voltage.

11. An optical pulse train generator according to claim 1 in which the optical modulator and the optical pulse shaping means are monolithically fabricated.

12. A return to zero (RZ) optical data generator incorporating an optical pulse generator according to claim 1 in which the generator is operable so that the frequency of the sinusoidal drive voltage is half the intended data bit rate, and further comprising optical modulating means to intensity modulating said optical pulse train in dependence on said data.

13. An optical data generator according to claim 12 in which the optical modulating means comprises an interferometric electro-optic modulator.

14. An optical data generator according to claim 12 in which the data bit rate is ten giga bits per second or higher.

15. An optical data generator according to claim 12 in which the optical modulating means, the optical modulator and the pulse shaping means are monolithically fabricated.

* * * * *